US00H002148H

(19) United States
(12) Statutory Invention Registration
Mastro et al.
(10) Reg. No.: US H2148 H
(43) Published: Mar. 7, 2006

(54) UNDERWATER NET PROTECTION SYSTEM

(75) Inventors: Stephen A. Mastro, Glen Mills, PA (US); Joseph H. Morris, Queenstown, MD (US); John K. Overby, Nottingham, PA (US); Joseph W. White, Turnersville, NJ (US); Henry K. Whitesel, Nottingham, PA (US)

(73) Assignee: The United States of America as represented by the Secretary of the Navy, Washington, DC (US)

(21) Appl. No.: 10/382,930

(22) Filed: Mar. 7, 2003

(51) Int. Cl.
*G02B 6/00* (2006.01)
*G08B 13/00* (2006.01)
*G01V 9/04* (2006.01)

(52) U.S. Cl. ..... 385/12; 340/541

(58) Field of Classification Search ..... 385/12–13, 385/15, 100; 340/541
See application file for complete search history.

(56) References Cited

U.S. PATENT DOCUMENTS 3,919,803 A * 11/1975 Manguso ..... 43/55
4,501,084 A * 2/1985 Mori ..... 43/17.5
6,481,378 B1 * 11/2002 Zemach ..... 119/223

FOREIGN PATENT DOCUMENTS

JP 60198479 A * 10/1985

* cited by examiner

*Primary Examiner*—M. Clement
(74) *Attorney, Agent, or Firm*—Jacob Shuster

(57) ABSTRACT

Netting constructed from strong elongated tubular elements encloses optic fiber signal lines. Such netting is anchored at spaced locations underwater adjacent to a dock to establish a protection zone for sea vessels within the zone from terrorist threats to be delivered underwater by penetration or attempted penetration of the netting which may also block damaging impact inflicted on sea vessels within the zone by missiles. If a missile however penetrates the netting for impacting the sea vessel, the location of such netting penetration is then indicated through the signal lines so as to enable rapid threat response.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

UNDERWATER NET PROTECTION SYSTEM

The present invention relates generally to use of netting to protect underwater located facilities, such as commercial seawater vessels and Navy ships for homeland security purposes.

BACKGROUND OF THE INVENTION

There are various systems, methods and/or devices already well known which may be or have been utilized to protect underwater located items such as the hulls of sea vessels in port or other facilities associated therewith, including a buoy, dock area, riverbank, etc. However use of such facilities for protection purposes would not provide damage deterrence measures by timely indicating precise location of attempted infiltrations so as to allow for rapid directed response.

SUMMARY OF THE INVENTION

An important object of the present invention is to not only provide protection against damage to underwater facilities, such as ship hulls, but to also indicate the location of an attempted unauthorized penetration of protective netting as well as to deter damage threats by use of telecommunication lines for example and nuclear water intake/discharge facilities.

Accordingly, pursuant to the present invention, an underwater protection zone adjacent to a dock for example is established by netting, constructed so as to deter and resist damage, as well as to accommodate signal communication therethrough in order to indicate location of attempted entry into the protective zone and net damage such as breaks or cuts resulting from penetration of the netting. Protection of items within the protection zone from underwater delivered threats is thereby enhanced.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
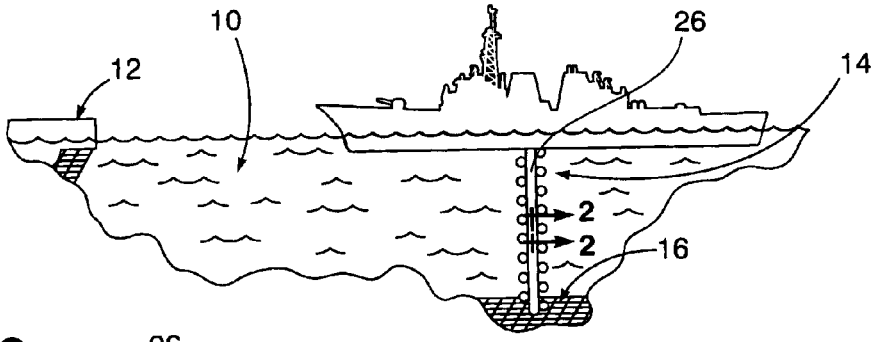
FIG. 1 is a partial underwater view extending from a dock to a net to form a protected underwater zone pursuant to the present invention.

Referring now to the drawing in detail, FIG. 1 illustrates an underwater protective zone 10 extending between a dock 12 and flexible netting 14 extending vertically upward from underwater anchor locations 16. Pursuant to the present invention, protection is provided for the underwater zone 10 encircled by the netting 14 as hereinafter explained, so as to deter attempted damage and locate attempted points of entry for purposes of damaging the hull of a sea vessel which may be docked in the zone 10, such as Naval ship or any other facility such as telecommunication and nuclear water intake/discharge devices.

Figure 3:
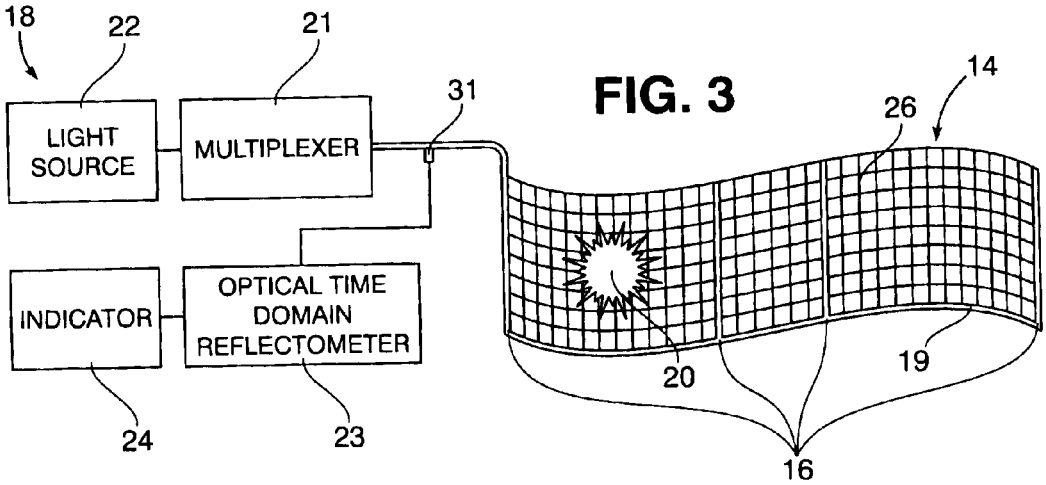
FIG. 3 is a front view of damaged netting connected to a threat indicator system.

The netting 14 is anchored at the spaced underwater locations 16, as diagrammed in FIG. 3. Penetration attempts and penetration damage to the netting 14 positioned over the anchor locations 16, such as a hole 20 for example, is monitored by a system 18. The bottom portion 19 of the netting 14 is made of substantially heavier material than the rest of the netting 14 so as to resist or prevent lifting thereof from the anchor point locations 16. The system 18 includes components generally known in the art such as a multiplexer 21 having a light source 22 and an optical time domain reflectometer 23 to which an indicator 24 is connected as diagrammed in FIG. 3. The precise location of the hole 20 in the netting 14 as well as any other locations at which penetration is attempted is thereby indicated as hereinafter referred to.

Figure 2:
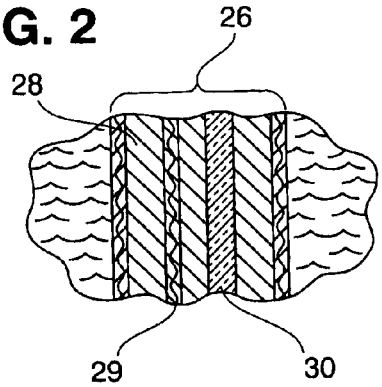
FIG. 2 is an enlarged partial section view taken substantially through a plane indicated by section line 2—2 in FIG. 1.

Also pursuant to the present invention, the netting 14 is constructed so as to exhibit a relatively high strength to not only resist damage, but to also accommodate damage indicating signal transmission in the event that damage inflicting penetration of the netting occurs. Toward those ends, the netting 14 is made from elongated netting elements 26, cross-fastened to each other. Each of such netting elements 26 as illustrated in FIG. 2, has a strong tubular portion 28 made of protective material for an optical fiber signal line 30 extending therethrough with a reinforcement member 29 in parallel therewith. Such netting 14 is connected by a bi-directional optical coupler 31 to the multiplexer 21 as shown in FIG. 3. The optical fiber signal lines 30 extend through such coupler 31 into the multiplexer 21 having the light source 22 connected thereto and the optical time domain reflectometer 23 of the system 18, so as to transmit damage indicating optical signals thereto from the netting 14. The signal generated by the light source 22 is passed through the multiplexer 21 which outputs optical signals through the bi-directional optical coupler 31 with approximately 10% of the signal going to the optical time domain reflectometer 23 and the balance passing through each optical fiber signal line 30 in turn. The reflected signal is passed back through the bi-directional optical coupler 31 to the optical time domain reflectometer 23 to calculate a delta time signal which is compared to a baseline so as to indicate an event on the indicator 24.

As a result of the foregoing described constructional arrangement of the netting 14, penetration or attempted penetration thereof for entry into the protective zone 10 is instantly detected by passage of the optical signal confined to the signal lines 30 to allow for rapid targeted response. The netting 14 will accordingly protect items within the zone 10 from swimmers for example carrying explosive devices by slowing them down, in which case such swimmers would possibly cut or attempt to cut the netting 14 for penetration purposes, which would be rapidly detected through the penetration detection system 18 and responded to as aforementioned. Furthermore, the netting 14 if penetrated at the hole 20 by a weapon fired missile traveling in a direction toward a damage inflicting location in the zone 10, may possibly redirect the missile away from the targeted vessel at the dock 12 to avoid damage thereto before such attempted damage is signaled and indicated through the system 18.

Obviously, other modifications and variations of the present invention may be possible in light of the foregoing teachings. It is therefore to be understood that within the scope of the appended claims the invention may be practiced otherwise than as specifically described.

What is claimed is:

1. A protection system comprising: netting means positioned underwater for protectively encircling a zone therein within which objects to be protected are located; and communication means extending through the netting means for detecting and indicating location of penetration of the netting means or attempted entry into the zone.

2. The protection system as defined in claim 1, wherein the netting means is constructed from an externally reinforced elongated tubular element through which the communication means extends.

3. The protection system as defined in claim 2, wherein the communication means includes an optic fiber signal line enclosed within the elongated tubular element formed from a covering material.

4. The protection system as defined in claim 3, wherein the netting means is anchored underwater at spaced anchor point locations by a heavier bottom portion to prevent lifting thereof at said anchor point locations.

5. The protection system as defined in claim 1, wherein the netting means is anchored underwater at spaced locations adjacent to a dock to establish said zone.

6. The protective system as defined in claim 1, wherein the netting means is constructued from a covering material protectively enclosing the communication means which includes an optic fiber through which penetration signals are transmitted.

7. A protective net assembly encircling an underwater zone within which underwater facilities are located, comprising: a plurality of interconnected netting elements forming an enclosure extending vertically about said underwater zone from bottom anchor locations; a source of light; and monitoring means directing light from said source confined during signal transmission within the netting elements for indicating damage and attempted penetration of the net assembly.

8. The protective net assembly as defined in claim 7, wherein the netting elements along the bottom anchor locations are heavier to resist uplift therefrom; and said underwater facilities enclosed within the net assembly include ship hulls.

* * * * *